March 11, 1941. M. J. ANDERSON 2,234,162
FEED TABLE
Filed Feb. 5, 1940 5 Sheets-Sheet 1

Inventor
M. J. Anderson
By Arthur M. Hahn
Attorney

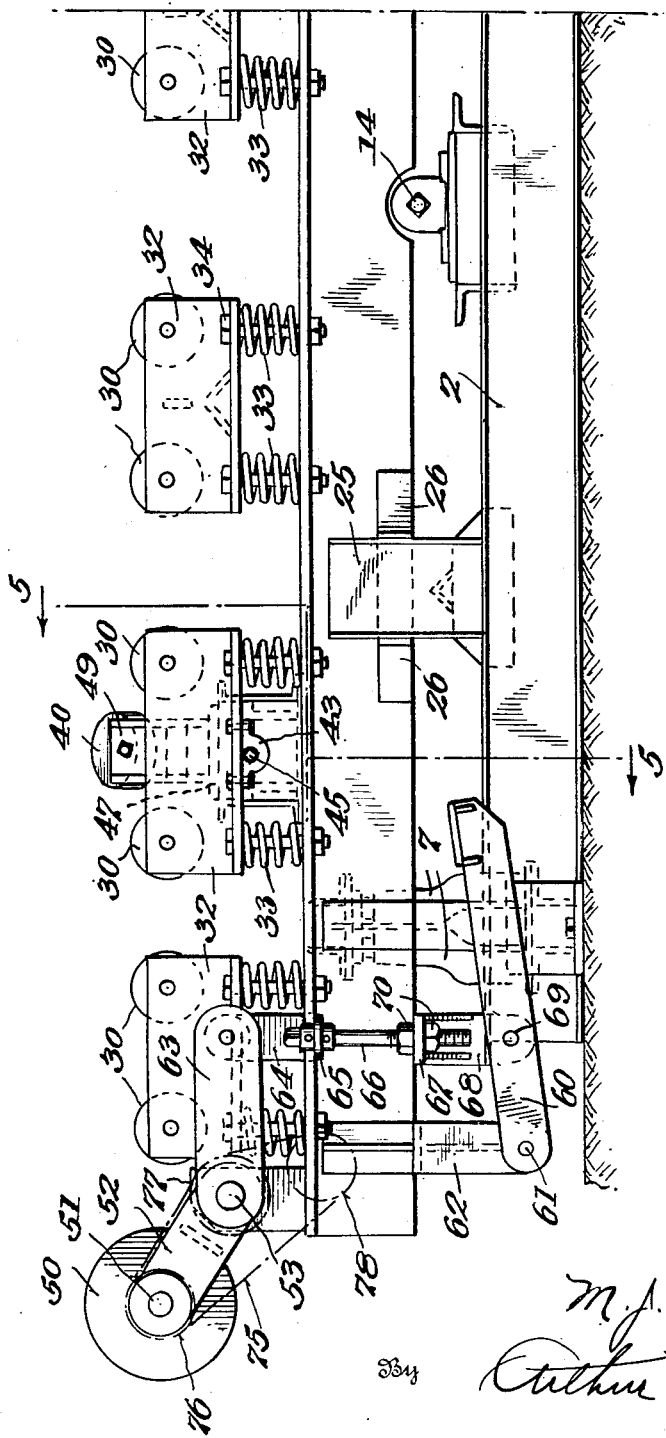

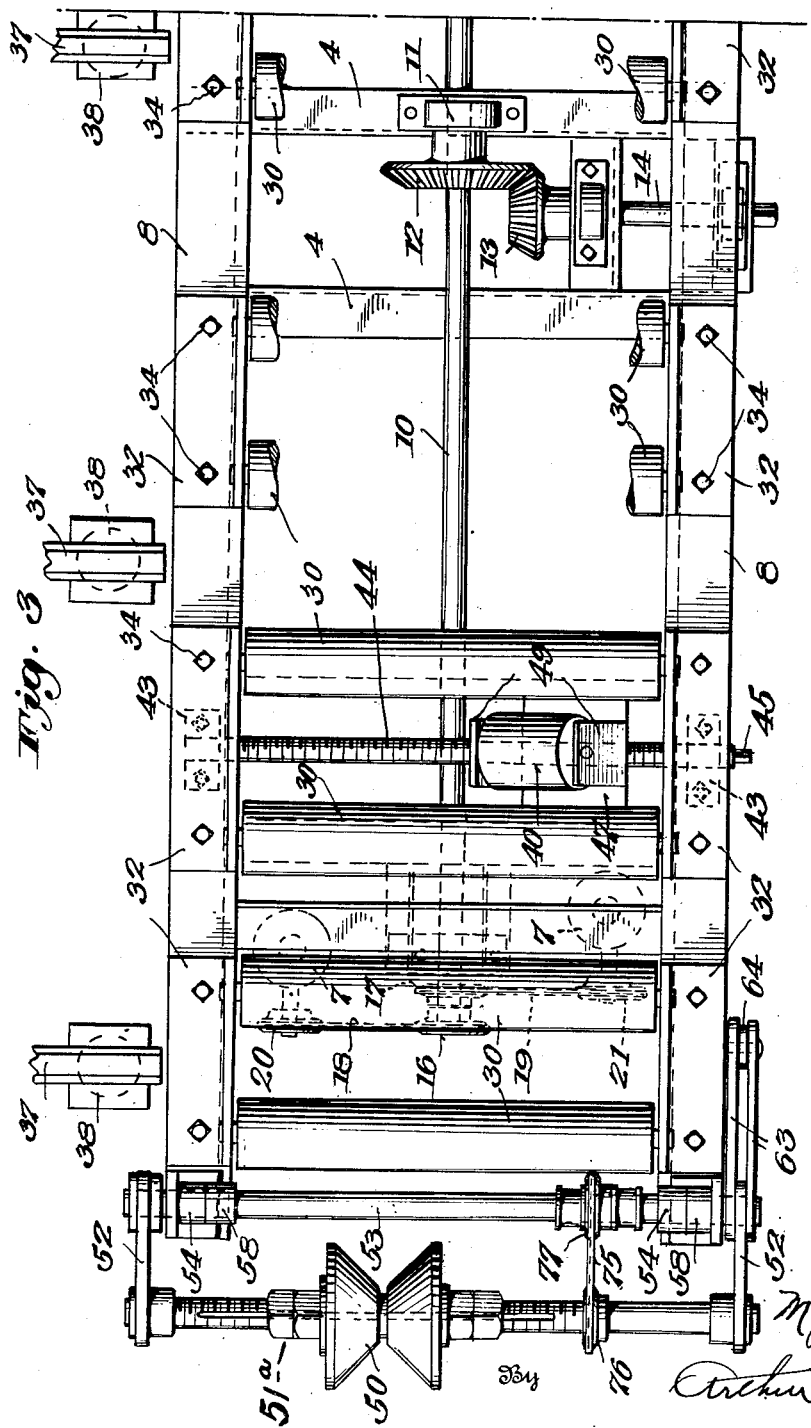

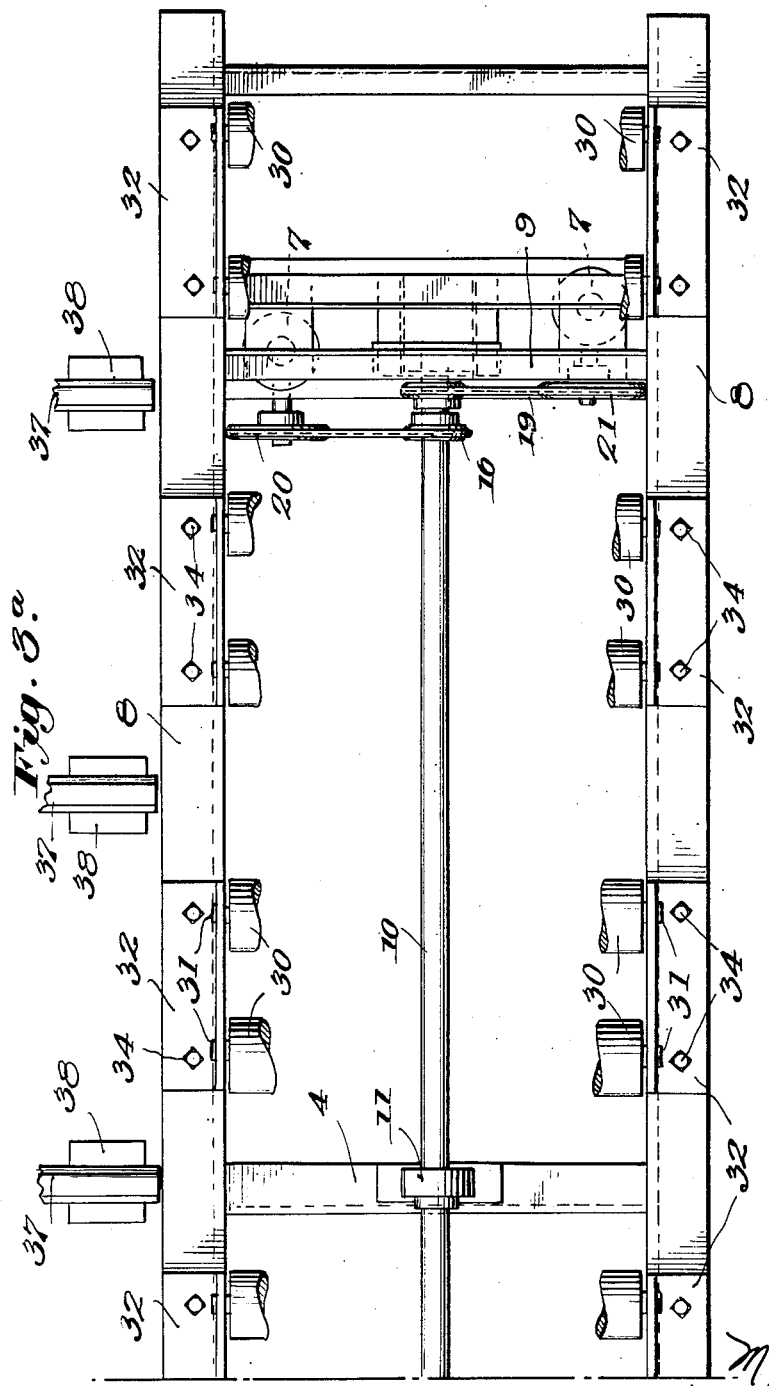

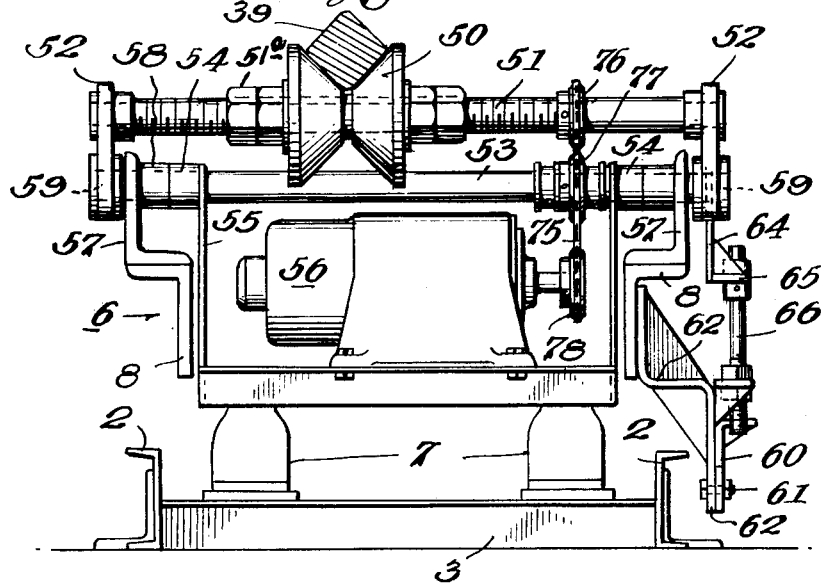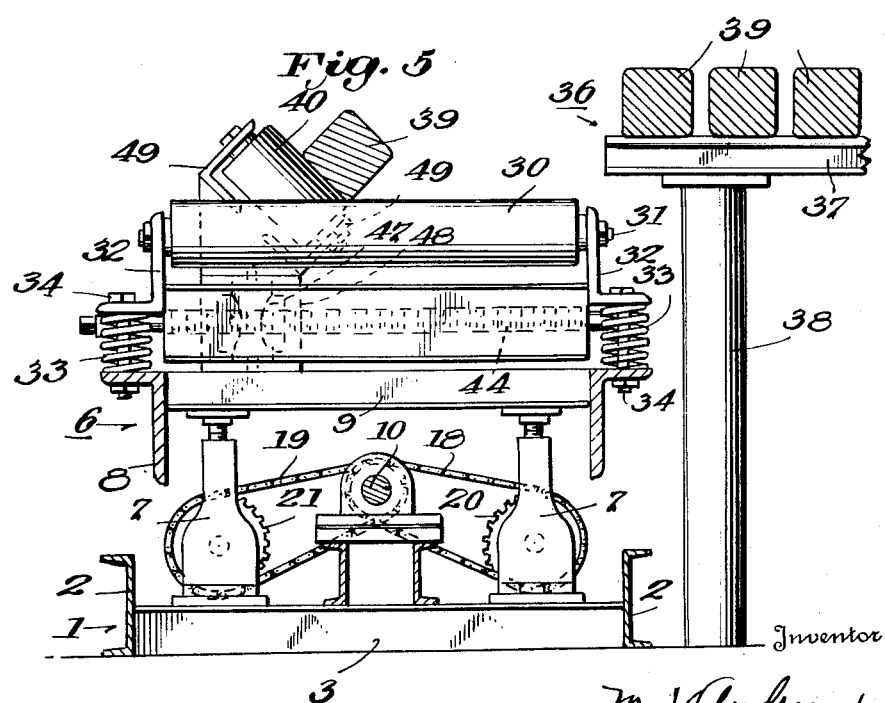

Patented Mar. 11, 1941

2,234,162

UNITED STATES PATENT OFFICE 2,234,162

FEED TABLE

Martin J. Anderson, Ellwood City, Pa., assignor to Mathews Conveyer Company, Ellwood City, Pa., a corporation of Pennsylvania Application February 5, 1940, Serial No. 317,438

7 Claims. (Cl. 198—127)

This invention relates to feed tables and is directed more particularly to a novel form of table for feeding bar stock of various cross sections to machines for performing certain operations on said bars, as for example shearing the same to predetermined lengths.

The primary object of the present invention is to provide a feed table for bar stock which shall facilitate and expedite the handling of the bars from the time they are positioned onto the table from an adjacent pile until they are accurately fed by power operated means to the blades of a shearing machine or other apparatus.

Another object is to provide a feed table which shall include a plurality of resiliently mounted roller supports for the bars so that the impact due to dropping the bars onto the table, from the adjacent pile shall be absorbed, thus preventing damage to the feed table and bars.

Another object is to provide a feed table of this character which shall be constructed and arranged in such manner that it may be readily adjusted vertically by the operator so that the bar thereon may be accurately aligned with the shearing blades or other mechanism which is to operate on the bar.

A further object is to provide a novel support for the bar on the feed table in the form of an inclined guide roll that may be readily adjusted transversely of the feed table to accurately align the bar with the aperture in the shear blades, or with the guides or other mechanism of the machine to which the bar is to be fed.

A still further object is to provide a power driven feed roller which may be moved into and out of engagement with the bar by the operator to feed the bar into the shear or other machine to the desired extent.

With the foregoing and other objects in view, the invention may be stated to consist in the various novel features of construction and arrangement or combination, all of which will be fully described hereinafter and pointed out in the appended claims.

In the drawings accompanying and forming a part of this application,

Figure 2 is a fragmentary side elevation of the feed table;

Figure 1:
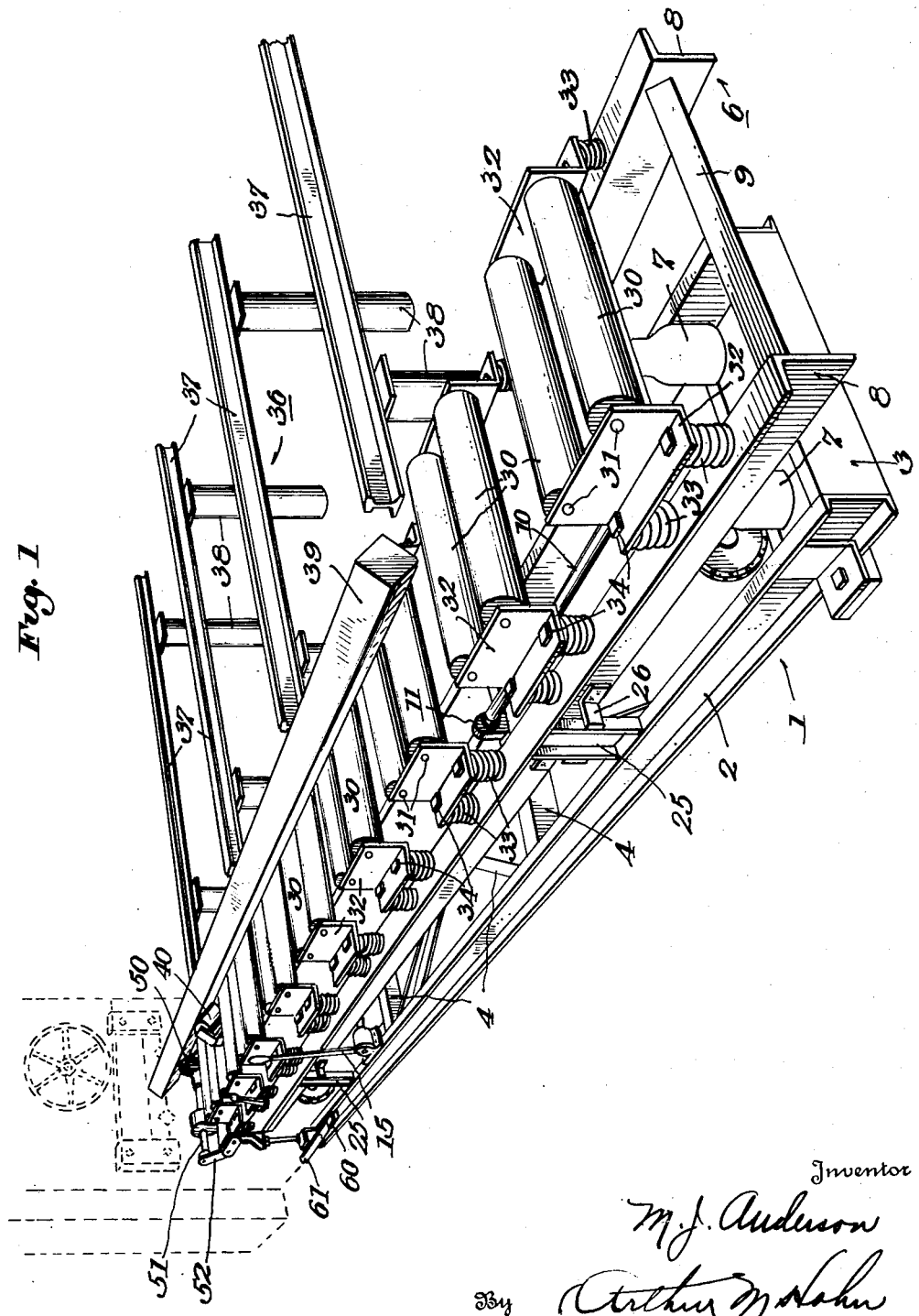
Figure 1 is a perspective view of a feed table constructed in accordance with my invention and showing the same for use in connection with a shearing machine.

Figures 3 and 3ª are top plan views with parts broken away of the complete feed table;

Figure 4 is an end elevation of the feed table as viewed from the left hand end of Figure 2; and Figure 5 is a vertical sectional view taken on the line 5—5 of Figure 2.

The support for the feed table comprises a substantially rectangular frame 1 that may be conveniently formed of channel iron side members 2 and end members 3, and the usual or suitable cross and diagonal braces 4. A rectangular sub frame 6 is moveable vertically with respect to the base frame 1 by means of a plurality of jacks 7 that are interconnected and adapted to operate in unison. The term "sub" as applied to frame 6 throughout the specification and claims is not used as a prefix meaning "under," but is used to refer to this frame as an auxiliary or secondary frame. The sub frame 6 is conveniently formed of longitudinally disposed angle iron side members 8 and a plurality of transverse tie members 9.

In the present illustrative embodiment of my invention, I have shown the sub frame supported on four jacks 7, two adjacent each end of the device. As shown in Figures 3 and 3ª, a centrally located main shaft 10 is journalled in a plurality of bearings 11 that are mounted on cross members 4 of bevel gear 12 (Figure 3) which meshes with a bevel pinion 13 that is carried by one end of a stub operating shaft 14, the latter projecting through one of the side members 2 of the base frame. Preferably the projecting end of the stub shaft is squared to receive an operating lever or handle 15 for actuating it. In the illustration, I have shown an oscillatable ratchet lever for rotating the stub shaft 14 in either direction of rotation, although a rotatable crank might be used if desired. Each end portion of the main shaft 10 is fitted with two sprockets 16 and 17 and through the medium of chains 18 and 19, they drive sprocket wheels 20 and 21 which are carried by the operating shafts 40 of a pair of the jacks 7. It is thus obvious that actuation of the operating handle 15 will rotate main shaft 10 and through the chains 18 and 19, the four jacks 7 will be simultaneously operated to raise or lower the sub frame 6 with respect to the main frame 1. It is understood, of course, that the sub frame will remain in adjusted position whenever the stub shaft 14 is no longer actuated. In order to guide the sub frame in its vertical movement, suitable guides are provided in the form of short vertical channel members 25 (Figures 1 and 2) which are welded or otherwise secured to the side members 2 of the base frame. Angle clips 26 welded to the side members 8 of the sub frame bear against each side of each of the guide members 25. Preferably each of the jacks 7 is welded at its base to the base frame and at its upper end to the sub frame to retain it in position.

The table proper, comprises a plurality of spring mounted roller units arranged transversely of and supported by the side frames 8 of the sub frame 6. These units may be of the type shown and described in Hubert M. Rishel Patents Nos. 2,077,188, 2,077,189 and 2,077,190 issued April 13, 1937. Preferably, each unit consists of a pair of rollers 30, 30 that are journalled on axles 31, 31 which project through angle side frames 32, 32. These side frames are supported by coil springs 33 which rest on the top surfaces of the angle members 8 of the sub frame. Bolts and nuts 34 interconnect the frames 32 and 8 and extend through the coil springs. These bolts not only serve to retain the parts in position but also place the springs under an initial predetermined force of compression as described in the aforementioned Rishel patents.

A rack 36 of any approved type is positioned adjacent the feed table for receiving the bar stock to be transferred onto the feed table. As shown in Figures 1 and 5, this rack comprises a plurality of spaced I beams 37 each supported by a pair of standards 38. The bar stock 39 on the rack is herein illustrated as being square in cross section although it will be understood that other shapes could be handled by the feed table. The operator by means of a suitable hook pulls one bar at a time from the rack onto the feed table. The resiliently mounted rollers 30 absorb the impact of the bar dropping thereon. Bars of this shape are sheared while resting on edge, that is, with one pair of opposite edges in a horizontal plane and the other pair in a vertical plane as shown in Figures 1 and 5. In order to support the bar in this position, I provide a roller 40 arranged at a 45° angle with respect to the table rollers and supported by a bracket 49 that is movable transversely of the table to properly align the bar stock 39 with the aperture in the shear blades. As shown particularly in Figures 2, 3 and 5, a pair of bearings 43 are bolted to the underside of the angle frame members 32 of one of the roller units adjacent the shear end of the table. Journalled in these bearings is a threaded shaft 44 having one end squared as shown at 45 and projecting beyond the roller unit so that a crank handle (not shown) may be applied to rotate the shaft. A nut 47 (Figure 5) is threaded on the shaft and this nut is pivotally mounted on a vertical axis between the upper and lower plates of a box-like structure 48, which carries the mounting brackets 49 of the diagonal roller 40. It is thus obvious that the diagonal supporting roller 40 may be easily shifted transversely of the feed table by applying a hand crank to the squared projecting end 45 of threaded shaft 44.

The table structure also includes power driven means under the control of the operator for engaging the bar stock to feed it longitudinally along the table. This means comprises a V-shaped driving wheel 50 which is adjustable along and is keyed to a transversely disposed shaft 51 that is carried by a pair of pivotally mounted arms 52. Suitable lock nuts 51ª threaded on the shaft 51 serve to maintain the driving wheel 50 in adjusted position. A counter shaft 53, arranged parallel with shaft 51, is journalled in bearings 54 that are formed in a U-shaped member 55 (Figure 4). The base of this U-shaped member serves as a support for a prime mover such as an electric motor 56 to be referred to hereinafter. A pair of angle iron brackets 57 are mounted on the side frames 8 of the sub frame and these brackets each carry bearings 58 for stub shafts 59 that are in transverse alignment with counter shaft 53. The ends of the arms 52 are rigidly mounted on these stub shafts, as clearly shown in Figure 4, and these arms and their respective stub shafts oscillate in the bearings 58 to raise and lower the drive wheel 50. The mechanism for oscillating the arms 52 comprises a foot treadle lever 60 that is pivoted at 61 to a hanger 62 depending from the sub frame. Rigidly mounted on one end of one of the stub shafts 59 are a pair of levers 63, arranged one on each side of the arm 52. The opposite ends of these levers are pivotally connected to a depending link 64 having a horizontal flange 65. A vertically disposed shaft 66 is journalled in this flange and extends through a similar flange 67 on a link 68 which is pivoted to the foot treadle lever at 69. As clearly shown in Figure 2, one of the nuts 70 on the rod 66 may be loosened and by rotating shaft 66, while holding the other nut, the angular position of the foot treadle may be adjusted.

When the foot treadle lever 60 is depressed, levers 63 will be pulled downwardly by links 64 and 68 and shaft 66, thereby causing the stub shaft 59 to which the levers 63 are attached to rotate in bearing 58. The rotation of this stub shaft 59 causes the arm 52, which is rigidly mounted thereon, to move the driving wheel upwardly to engage the bar stock. The arm 52 and stub shaft 59 on the opposite side of the conveyer serve to support and guide the shaft 51.

The drive wheel 50 is rotated constantly by a chain 75, engaged over a sprocket wheel 76 on shaft 51, thence over a sprocket wheel 77 on countershaft 53, and around a sprocket wheel 78 on the motor shaft. With this arrangement, the shaft 51 and the drive wheel 50 are free to move in an arc about the countershaft 53 as a center without disturbing the drive between the motor 56 and the drive wheel.

When the feed table is used with a shearing machine, it must be readily adjusted to feed bar stock varying from one inch square or round to eight inch stock square or round. It is understood of course that other cross sectional shapes could be handled equally well. In operation, the proper shear knives will be placed in the shearing machine for the particular size or sizes to be cut. In the larger sizes, the shear blades each usually accommodate two different sizes side by side, while for smaller sizes three or four openings will be formed in each shear blade. Having determined the size of stock to be cut, the operator raises the sub frame as previously described to align the top of the rollers on the table with the bottom of the opening in the lower shear blade. The diagonal roller 40 is then adjusted transversely of the table so that when a bar is positioned on the table against the roller it will be aligned with the proper opening in the shear blades. The operator then depresses foot treadle 60 to elevate the feed wheel 50 into driving contact with the bar and this serves to move the bar longitudinally along the table and through the opening in the shear blades. When the bar is advanced to the desired extent, the foot treadle is released, thereby permitting drive wheel 50 to drop and stop the movement of the bar. The shear is then actuated to cut off the length of bar stock.

What I claim is:

1. A feed table of the character described comprising a main frame and a sub frame, a plurality of roller units carried by said sub frame, resilient means interposed between said roller units and said sub frame to permit relative movement therebetween and thereby absorb the impact of articles dropped onto said rollers, means for raising and lowering said sub frame with respect to said main frame to align the article on said rollers with the device to receive said article, power operated driving means adapted to engage the article to feed the same along said rollers, and manually operable means for controlling the operation of said driving means.

2. A feed table of the character described comprising a frame having a plurality of supporting rollers journalled therein and adapted to receive the articles to be fed, a guide roller carried by said frame and projecting above the plane of said supporting rollers, means for adjusting said guide roller transversely of said frame to align the article on said supporting rollers with the device to receive said article, a power operated roller adapted to engage the article to feed the same along said supporting rollers, and manually operable means for moving said feed device in a vertical plane to engage or disengage the article.

3. A feed table of the character described comprising a main frame and a sub frame, a plurality of roller units carried by said frame, resilient means interposed between said roller units and said sub frame to permit relative movement therebetween and thereby absorb the impact of articles dropped on said rollers, means for raising and lowering said sub frame in a vertical plane with respect to said main frame to align the article with the device to receive the article, a guide roller carried by and adjustable transversely of said sub frame in a horizontal plane for aligning the article with the device to receive the article, a power operated driving roller adapted to engage the article to feed the same along said roller units, and manually operable means for moving said feed roller in a vertical plane to engage or disengage the article.

4. A feed table of the character described comprising a main frame and a sub frame, a plurality of roller units carried by said frame, resilient means interposed between said roller units and said sub frame to permit relative movement therebetween and thereby absorb the impact of articles dropped on said rollers, a plurality of jacks interposed between said main frame and said sub frame, means for actuating said jacks simultaneously to raise and lower said sub frame in a vertical plane with respect to said main frame to align the article on said roller units with the device to receive said article, a guide roller carried by and adjustable transversely of said sub frame in a horizontal plane for aligning the article with the device to receive the article, a power operated driving roller adapted to engage the article to feed the same along said roller units, and manually operable means for moving said feed roller in a vertical plane to engage or disengage the article.

5. A feed table of the character described comprising a frame having a plurality of roller units mounted thereon and adapted to receive the articles to be fed, resilient means interposed between said frame and said roller units to permit relative movement therebetween and thereby absorb the impact of articles dropped on said rollers, an angularly disposed guide roller carried by said frame and projecting above the plane of said roller units, means for adjusting said guide roller transversely of said frame to align the article on said supporting rollers with the device to receive said article, and power operated driving means adapted to engage the article to feed the same along said roller units.

6. A feed table of the character described comprising a frame, a plurality of roller units carried by said frame and adapted to receive the article to be fed, resilient means interposed between said frame and said roller units to permit relative movement therebetween and thereby absorb the impact of articles dropped on said rollers, a guide roller carried by said frame for aligning the article on said rollers with the device to receive said article, driving means adapted to engage the article to feed the same along said rollers, and means for moving said driving means into and out of engagement with said article.

7. A feed table of the character described comprising a frame, a plurality of rollers carried by said frame and adapted to receive the article to be fed, a substantially V-shaped power operated driving roller adapted to engage and feed the article along said rollers, said driving roller being adjustable transversely of said frame to align the same with the device to receive the article, and means for moving said driving roller in a vertical plane to engage or disengage the article to feed the same along the table.

MARTIN J. ANDERSON.